United States Patent [19]
Sasaki

[11] Patent Number: 5,520,824
[45] Date of Patent: May 28, 1996

[54] METHOD OF SEPARATING A SOLID-LIQUID MIXTURE BY WRINGING A TWISTED FILTER BELT ENCLOSING THE MIXTURE

[75] Inventor: Yasuhiro Sasaki, Tokyo, Japan

[73] Assignee: Kaneto Shoji Co., Tokyo, Japan

[21] Appl. No.: 524,326

[22] Filed: Sep. 6, 1995

[51] Int. Cl.⁶ .................................................. B01D 33/64
[52] U.S. Cl. ............................ 210/780; 210/783; 68/21; 198/819; 198/839; 100/120
[58] Field of Search .................................. 198/819, 839; 68/21, 94, 95; 100/120; 210/780, 783

[56] References Cited

U.S. PATENT DOCUMENTS

| | | |
|---|---|---|
| 2,796,810 | 6/1957 | Müller . |
| 3,654,074 | 4/1972 | Jacquelin . |
| 4,039,450 | 8/1977 | Brown . |
| 5,433,851 | 7/1995 | Itoh . |

FOREIGN PATENT DOCUMENTS 7-29005  4/1995  Japan .
2141352  12/1984  United Kingdom ............... 100/120

OTHER PUBLICATIONS

English language Abstract of Japanese Patent Application No. 5-45559, First Publication (Kohai), Hei 6-254312, published Sep. 13, 1994.

*Primary Examiner*—Robert J. Popovics
*Attorney, Agent, or Firm*—Fish & Richardson

[57] ABSTRACT

The solid content and liquid content in a solid-liquid substance can be separated continuously at a high solid-liquid separation ratio by: causing a looped filter cloth member to travel, the filter cloth member being wound at least once around a wringing roller, and having a twisted portion at which the filter cloth member is twisted at least once and wound around the wringing roller; inducing a primary rotary motion of the wringing roller in a direction in which the filter cloth member travels; inducing secondary rotary motion of the wringing roller in a direction in which the filter cloth member is twisted upstream with respect to the wringing roller; and supplying a solid-liquid substance to an upstream portion of the filter cloth member with respect to the wringing roller.

4 Claims, 4 Drawing Sheets

METHOD OF SEPARATING A SOLID-LIQUID MIXTURE BY WRINGING A TWISTED FILTER BELT ENCLOSING THE MIXTURE

BACKGROUND OF THE INVENTION

1. Field of the Invention

The present invention relates to an apparatus and method for separating the solid content from the liquid content (the separating process hereinafter referred to as "solid-liquid separation") in a mixture of solids and liquids (the mixture hereinafter referred to as "solid-liquid substance").

2. Description of Related Art

Various apparatuses for solid-liquid separation have been utilized in manufacturing various products as well as waste water disposal. As apparatuses for solid-liquid separation, those of filtration-type and of centrifuge-type have been hitherto known.

As an example of the filtration-type apparatuses, a filter press has been known, by which an unprocessed fluid containing solid content is introduced into a filtration section, and the pressure is applied to the unprocessed fluid whereby liquid content therein is forcibly released from the filtration section.

In addition, as an example of the centrifuge-type apparatuses, an apparatus has been known which separates liquid content from an unprocessed fluid by centrifugal force, and continuously releases the liquid content from a release duct while continuously releasing the concentrated solid content from another release duct.

However, the filtration-type apparatus has a problem in its poor operability, in that only batch-type solid-liquid separation can be conducted by removing a cake when a certain amount has accumulated in the filtration section, washing the filter, and then restarting filtration; thus, such solid-liquid separation cannot be conducted continuously.

Furthermore, the centrifuge-type apparatus has disadvantages in that when a continuous operation is conducted, a high solid-liquid separation ratio cannot be obtained, since the cake is obtained simply in the form of a concentrated fluid; and that when it is necessary to take out solid content as a cake at a higher separation ratio, a batch operation must be conducted as in the filtration-type apparatus.

SUMMARY OF THE INVENTION

In view of the above, the object of the present invention is to provide an apparatus and a method for solid-liquid separation by which a separation process can be conducted continuously at a high separation ratio.

A first aspect of the present invention is provided in order to achieve the above object by conducting a method for solid-liquid separation comprising the steps of:

causing a looped filter cloth member to travel, the filter cloth member being wound at least once around a wringing roller, and having a twisted portion at which the filter cloth member is twisted at least once and wound around the wringing roller;

inducing a primary rotary motion of the wringing roller in a direction in which the filter cloth member travels (the primary rotary motion hereinafter simply referred to as "rotary motion");

inducing secondary rotary motion of the wringing roller in a direction in which the filter cloth member is twisted upstream with respect to the wringing roller (the secondary rotary motion hereinafter referred to as "revolutionary motion"); and supplying a solid-liquid substance to an upstream portion of the filter cloth member with respect to the wringing roller.

Thus, the above first aspect of the present invention can be performed by using an apparatus for solid-liquid separation comprising a pair of rotational members each of which rotates around a respective axis, a looped filter cloth member which is arranged so as to travel around the pair of rotational members, and a wringing roller having an axis and a circumferential surface around which the filter cloth member is wound at least once;

in which the filter cloth member has a twisted portion between the pair of rotational members; at the twisted portion the filter cloth member being twisted at least once, and wound around the wringing roller; and the wringing roller rotates around the axis, and also rotates (revolves) in a direction in which the filter cloth member is twisted upstream with respect to the wringing roller.

A second aspect of the present invention is provided in order to achieve the above object by conducting solid-liquid separation by using an apparatus for solid-liquid separation according to the first aspect of the present invention, in which the wringing roller is in a shape of a truncated cone having a smaller-diameter end and a larger-diameter end, tapering toward one end of the axis of the wringing roller;

the wringing roller is provided with a stopper at the smaller-diameter end, the stopper having a diameter larger than the diameter of the smaller-diameter end; and the filter cloth member is wound around the wringing roller in a manner such that an upstream portion of the filter cloth member with respect to the wringing roller is adjacent to the larger-diameter end, and a downstream portion of the filter cloth member with respect to the wringing roller is adjacent to the smaller-diameter end.

A third aspect of the present invention is provided in order to achieve the above object by conducting solid-liquid separation by using an apparatus for solid-liquid separation according to the first or second aspect of the present invention, in which the pair of rotational members are horizontally aligned, and;

the filter cloth member is twisted an odd number of times at the twisted portion, which is in a top portion of a loop formed by the filter cloth member.

A fourth aspect of the present invention is provided in order to achieve the above object by conducting solid-liquid separation by using an apparatus for solid-liquid separation according to the first, second, or third aspect of the present invention, in which the filter cloth member comprises a pair of looped rope members and a looped filter cloth material provided therebetween;

each of the rotational members comprises a pair of pulleys which rotate coaxially; and each of the looped rope members is arranged so as to travel around one of the pulleys of one of the rotational members and one of the pulleys of the other rotational member.

According to the first aspect of the present invention, since a filter cloth member with a twisted portion is provided around rotational members, and the filter cloth member is wound around a wringing roller at the twisted portion, a solid-liquid substance supplied to an upstream portion of the filter cloth member with respect to the wringing roller is wrapped by the twisted portion of the filter cloth member as the filter cloth member proceeds toward the wringing roller. Subsequently, the twisted portion wrapping the solid-liquid substance is then wound around the wringing roller, and thus solid-liquid separation is carried out according to which pressure between the wringing roller and the filter cloth member is applied to the solid-liquid substance, and the liquid content in the solid-liquid substance penetrates through the filter cloth member.

Therefore, according to the first aspect of the present invention, since a solid-liquid substance is gradually wrapped by a twisted portion of a filter cloth member using a twisting force generated by a revolutionary motion of a wringing roller, and since the twisted portion is wound around the wringing roller which rotates and revolves, both pressure from the twisting of the filter cloth member and pressure between the wringing roller and the filter cloth member are applied to the solid-liquid substance. Accordingly, the liquid content of the solid-liquid substance is removed at a high solid-liquid separation ratio. Moreover, since the twisted portion of the filter cloth member is spread out automatically by the revolutionary motion of the wringing roller at the position where the twisted portion of the filter cloth member leaves the wringing roller, solid content of the solid-liquid substance can be released automatically, and thus the solid-liquid separation process can be conducted automatically and continuously.

According to the second aspect of the present invention, since the wringing roller is in the shape of a truncated cone, the filter cloth member being wound around the wringing roller in a manner such that the upstream portion of the filter cloth member with respect to the wringing roller is adjacent to the larger-diameter end, and that the downstream portion of the filter cloth member with respect to the wringing roller is adjacent to the smaller-diameter end, a portion of the filter cloth member reaching the wringing roller always presses another portion of the filter cloth member leaving the wringing roller against the stopper. Thus, higher pressure can be applied to the solid-liquid substance in the filter cloth member.

Therefore, according to the second aspect of the present invention, solid-liquid separation can be conducted at a higher solid-liquid separation ratio.

According to the third aspect of the present invention, since the filter cloth member is twisted an odd number of times at the twisted portion which is wound around the wringing roller, the surface of the filter cloth member which received a solid-liquid substance upstream with respect to the wringing roller faces downward when it leaves the wringing roller. Thus, the solid content obtained after solid-liquid separation at the wringing roller falls naturally due to gravity.

According to the fourth aspect of the present invention, since the filter cloth member is constructed from a pair of looped rope members and a looped filter cloth material, each of the looped rope members being arranged so as to travel around one of the pulleys composing one of the rotational members and one of the pulleys composing the other rotational member, the pulleys maintain distance between both lateral ends of the filter cloth member. Accordingly, the filter cloth member opens sufficiently near the rotational members, facilitating the reception of a solid-liquid substance and the release of the solid content. Thus, a continuous process of solid-liquid separation is more easily conducted.

DESCRIPTION OF THE PREFERRED EMBODIMENTS

Figure 1:
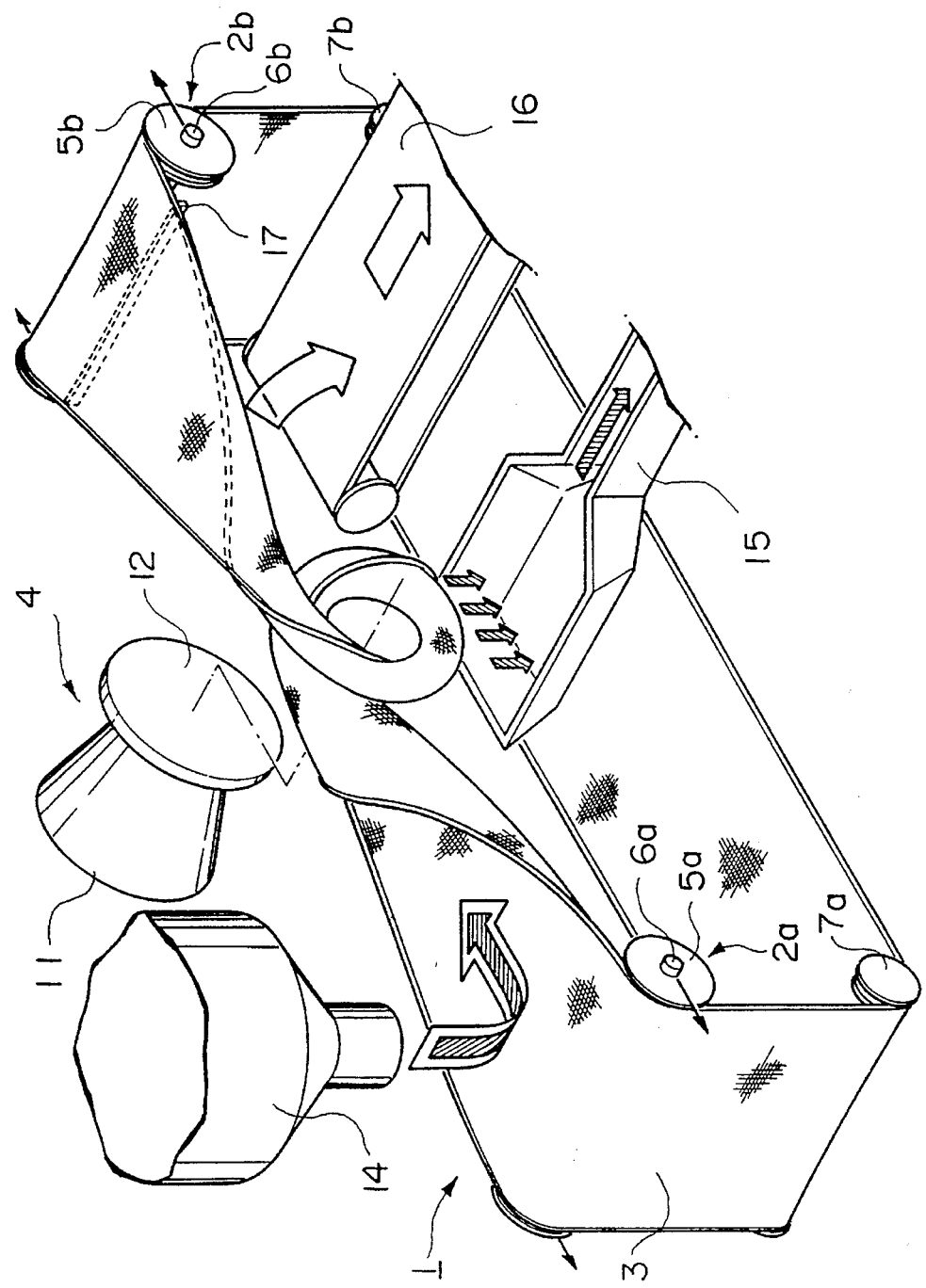
FIG. 1 is a perspective diagram showing the arrangement of an embodiment of an apparatus for solid-liquid separation according to the present invention.

FIG. 1 illustrates an embodiment of an apparatus for a solid-liquid separation according to the present invention. In this figure, reference numeral 1 indicates the apparatus for solid-liquid separation. This apparatus 1 for solid-liquid separation can be suitably used in a solid-liquid separation process for separating a solid-liquid substance which contains a relatively large amount of solid content, such as: a process for separating soybeans, by squeezing them, into soybean milk and okara (the solid remains) in manufacturing tofu (bean curd); a solid-liquid separation process for waste fluid which has been concentrated to a certain degree by a preliminary process; and a process of separating liquid content from a compound obtained by a precipitation operation. This apparatus 1 for solid-liquid separation comprises a pair of rotational members 2a, 2b, a looped filter cloth member 3 which is arranged so as to travel around the pair of rotational members 2a, 2b, and a wringing roller 4 having a circumferential surface around which the filter cloth member is wound.

Each of the rotational members 2a, 2b is constructed from a pair of pulleys 5a, 5a (5b, 5b), each of which has a deep groove. The rotational members 2a, 2b are horizontally aligned, and attached to rotary shafts 6a, 6b, respectively. Each of the rotary shafts 6a, 6b is rotatably mounted on bearings which are not shown in the drawings. The bearings are fixed to frames which are also not shown in the drawings.

Furthermore, pulleys 7a, 7a, 7b, 7b, which are auxiliary rotational members, are provided beneath the pulleys 5a, 5a, 5b, 5b, respectively. In a similar manner to the pulleys 5a, 5a, 5b, 5b, each of these pulleys 7a, 7a, 7b, 7b has a deep groove, and each pair of these pulleys 7a, 7a (7b, 7b) is fixed to a rotary shaft, which is not shown in the drawings. The filter cloth member 3 is arranged so as to travel around the pulleys 7a, 7a, 7b, 7b as well as the pulleys 5a, 5a, 5b, 5b.

Figure 2:
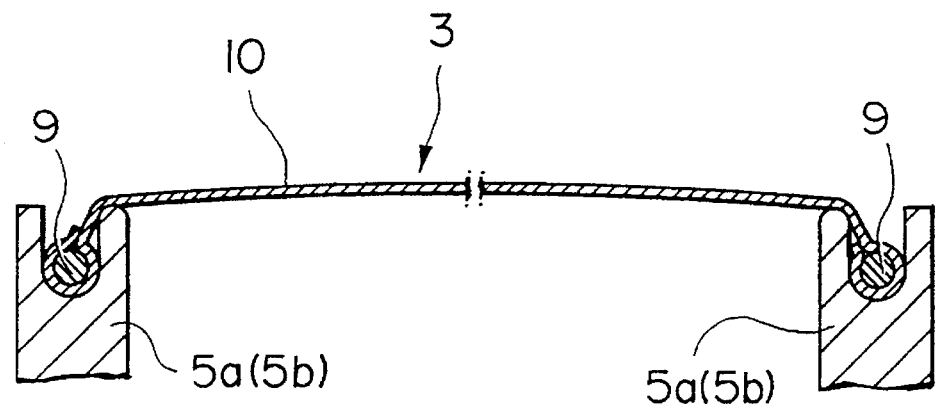
FIG. 2 is a perspective diagram showing the principal arrangement in which a filter cloth member is arranged with pulleys.

As shown in FIG. 2, the filter cloth member 3 is constructed from a pair of looped rope members 9, 9, and a looped filter cloth material 10 provided therebetween. Each of the looped rope members 9, 9 is stretched over the pulleys 5a, 5b and the pulleys 7a, 7b, so as to be able to travel around these pulleys. The looped rope members 9, 9 are ropes having a relatively small diameter, or the like, which are made of a material having suitable strength and flexibility.

The filter cloth material 10 is made from a conventional filter cloth. The mesh size of the filter cloth material 10 can be suitably chosen depending on the size of the particles, or the like, composing the solid content in the solid-liquid substance to be processed. In addition, the filter cloth material 10 is attached to the rope members 9, 9 by way of folding both lateral end portions of the filter cloth material 10 and enclosing the rope members 9, 9 therein, respectively.

Figure 3:
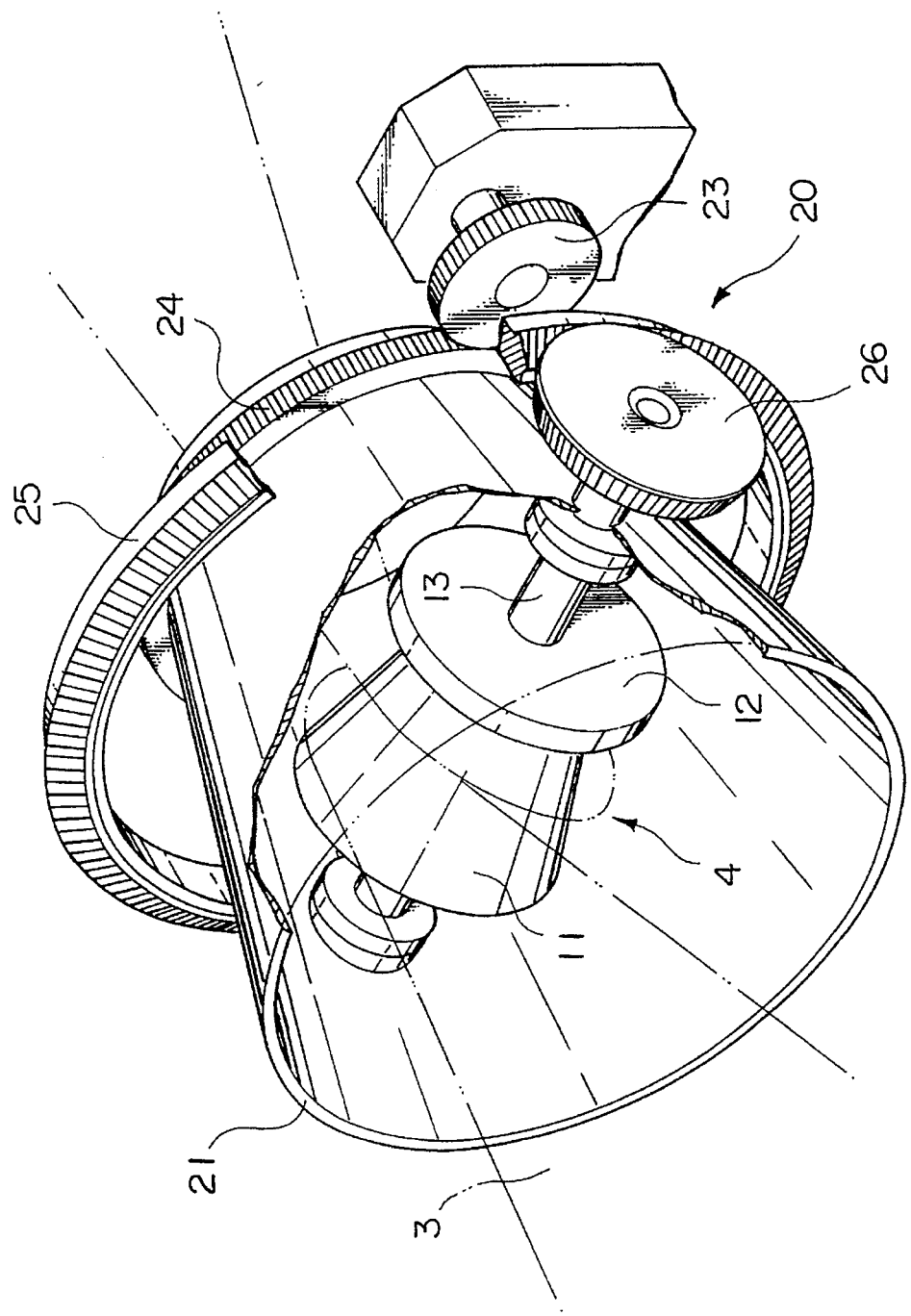
FIG. 3 is a perspective diagram showing the arrangement of a wringing roller and a mechanism cooperating therewith.

As shown in FIG. 3, the wringing roller 4 is constructed from a roller main body 11 having the shape of a truncated cone, and a stopper 12 having the shape of a disc, which is provided at the end of the roller main body 11 having a smaller diameter so as to form a unitary body therewith. The wringing roller 4 rotates around the central axis of the roller main body 11. In addition, as will be explained in the following, the wringing roller 4 also revolves around the central portion of the central axis of the roller main body 11 so that this central axis will move in the same plane. A rotary shaft 13 is inserted through the wringing roller 4 along the central axis thereof. A mechanism 20 for the revolutionary motion of the wringing roller 4 is coupled with the rotary shaft 13.

The mechanism 20 for the revolutionary motion contains the wringing roller 4 therein, and is constructed from a pipe-shaped housing sleeve 21 to which the rotary shaft 13 of the wringing roller 4 is rotatably fixed, a motor 22 which causes the housing sleeve 21 to rotate together with the wringing roller 4, gears 23, 24 for transmitting the rotational driving force of the motor 22 to the housing sleeve 21, a bevel gear 25 arranged to be fixed around the outer circumference of the housing sleeve 21 at a distance, and a bevel gear 26 which is attached to the rotary shaft 13 of the wringing roller 4 and which meshes with the bevel gear 25. Additionally, the housing sleeve 21 is a tapering pipe-shaped body, one end of which has a larger diameter, and the other end of which has a smaller diameter. The gear 24 is provided at the periphery of the smaller-diameter end. Furthermore, under the housing sleeve 21, supportive rollers (not shown in the drawings) are provided by which the housing sleeve 21 is rotatably supported. Moreover, the bevel gear 25 is supported by and fixed to legs (not shown in the drawings) in a position where the center of the bevel gear 25 coincides with the axis of rotation of the housing sleeve 21.

According to the above arrangement, a rotational driving force is transmitted from the gear 23 coupled with the shaft of the motor 22 to the gear 24 having the shape of a ring which is provided around the outer circumference of the housing sleeve 21 as an integral body. Accordingly, the housing sleeve rotates, whereby the wringing roller 4 revolves, the rotary shaft 13 thereof being supported at both ends by the circumferential wall of the housing sleeve 21. As will be explained in the following, the direction of revolutionary motion of the wringing roller 4 is the same as the direction in which the filter cloth member 3 is twisted in the upstream portion with respect to the wringing roller. Furthermore, as the revolutionary motion of the wringing roller 4 causes the bevel gear 26 coupled with one end of the rotary shaft 13 to run on the bevel gear 25, the wringing roller 4 rotates with the rotary shaft 13.

Moreover, the filter cloth member 3 is twisted at least once between the pair of rotational members 2a, 2b. According to this embodiment of the present invention as shown in FIG. 1, the filter cloth member 3 is twisted three times. The twisted portion is wound once around the wringing roller 4. Also, the filter cloth member 3 is wound around the wringing roller 4 in a position such that the upstream portion (i.e., the side toward the rotational member 2a) of the filter cloth member 3 with respect to the wringing roller 4 is adjacent to the larger-diameter end of the wringing roller 4, and that the downstream portion (i.e., the side toward the rotational member 2b) of the filter cloth member 3 with respect to the wringing roller 4 is adjacent to the smaller-diameter end the wringing roller 4. The filter cloth member can be made by preliminarily twisting a band a predetermined number of times, winding the twisted portion around the wringing roller 4, and joining both ends of the band by sewing.

Furthermore, a feeder 14 for holding a solid-liquid substance to be processed and for continuously supplying this to the filter cloth member 3 is provided over the filter cloth member 3 in the upstream portion with respect to the wringing roller 4 (i.e., above the pulleys 5a, 5a). Moreover, in a position which is inside the loop formed by the filter cloth member 3 traveling around the pulleys 5a, 5a, 5b, 5b and pulleys 7a, 7a, 7b, 7b and which is beneath the wringing roller 4 (beneath the housing sleeve 21), a liquid collector 15 is provided for collecting the liquid content which is separated from the solid content by the wringing of the wringing roller, and which drip from the housing sleeve 21 due to gravity. The liquid collector further guides the collected liquid to another container, which is not shown in the drawings.

In addition, at the side toward the pulleys 5a, 5b with respect to the liquid collector 15, a conveyer 16 is provided for receiving and conveying to another container (not shown in the drawings) the solid content, which is separated from the liquid content and wrapped by the filter cloth member 3, dropped onto the conveyer 16 due to gravity when the twisted portion of the filter cloth member 3 is untwisted as this portion travels from the wringing roller 4 toward pulleys 5b, 5b. That is to say, since the filter cloth member 3 is twisted three times between the rotational members 2a, 2b, and since the twisted portion is wound around the wringing roller 4, the surface of the filter cloth member 3 which received a solid-liquid substance (the upper surface at the side toward the rotational member 2a) faces downward when the twisted portion is untwisted as it leaves the wringing roller 4, whereby the solid content on the filter cloth member 3 automatically falls. In addition, adjacent to the lower surface of the filter cloth member 3 over the conveyer 16, a scraper 17 is provided to scrape off the solid content adhering to the filter cloth member 3.

Figure 4:
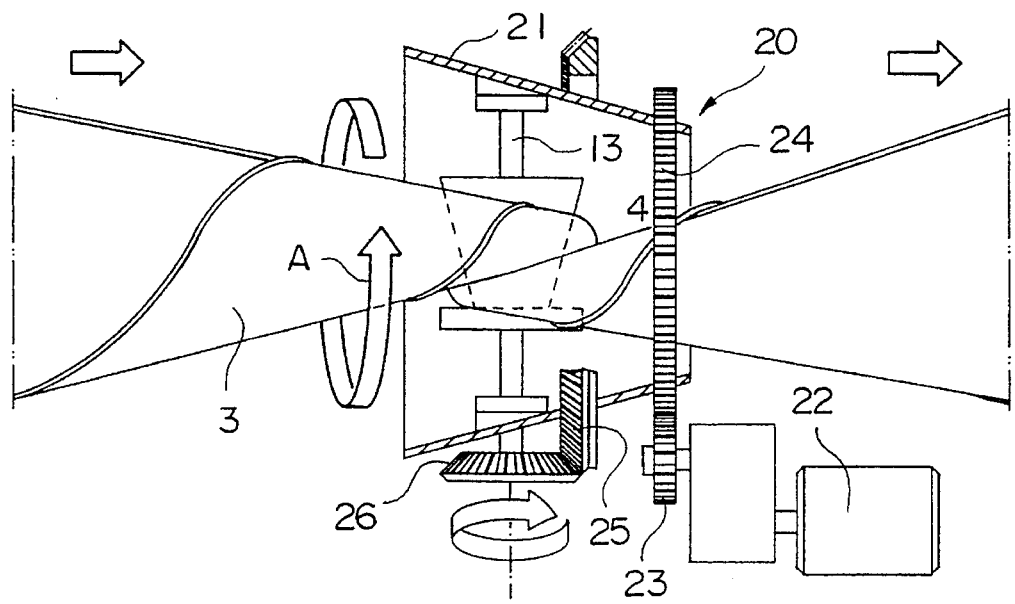
FIG. 4 is a sectional side elevation diagram illustrating the rotary motion of a wringing roller and concurrent twisting of a filter cloth member.

Solid-liquid separation using the apparatus 1 for solid-liquid separation according to the above arrangement is conducted by starting the motor 22 to cause the wringing roller 4 to rotate and revolve, thereby moving the filter cloth member 3 in the direction of rotary motion of the wringing roller 4 so that the filter cloth member 3 travels around the pulleys 5a, 5a, 5b, 5b, and pulleys 7a, 7a, 7b, 7b. Then, the filter cloth member 3 is twisted by the revolutionary motion of the wringing roller 4 as indicated by arrow A in FIG. 4, and thus the filter cloth member 3 is further twisted successively in the upstream portion with respect to the wringing roller 4. Furthermore, since the twisted portion is wound around the wringing roller 4, both lateral ends of the filter cloth member 3 become adjacent to each other to form a pocket, as the portion of the filter cloth member 3 which left the rotational member 2a (pulleys 5a, 5a) nears the wringing roller 4. When the portion of the filter cloth member 3 further proceeds, the portion, being completely twisted, reaches the wringing roller 4. Then, the twisted portion travels around the wringing roller 4 by the rotary motion thereof, while the twisted portion is being untwisted by the revolutionary motion, until the portion of the filter cloth member 3 leaves the wringing roller 4.

Figure 5:
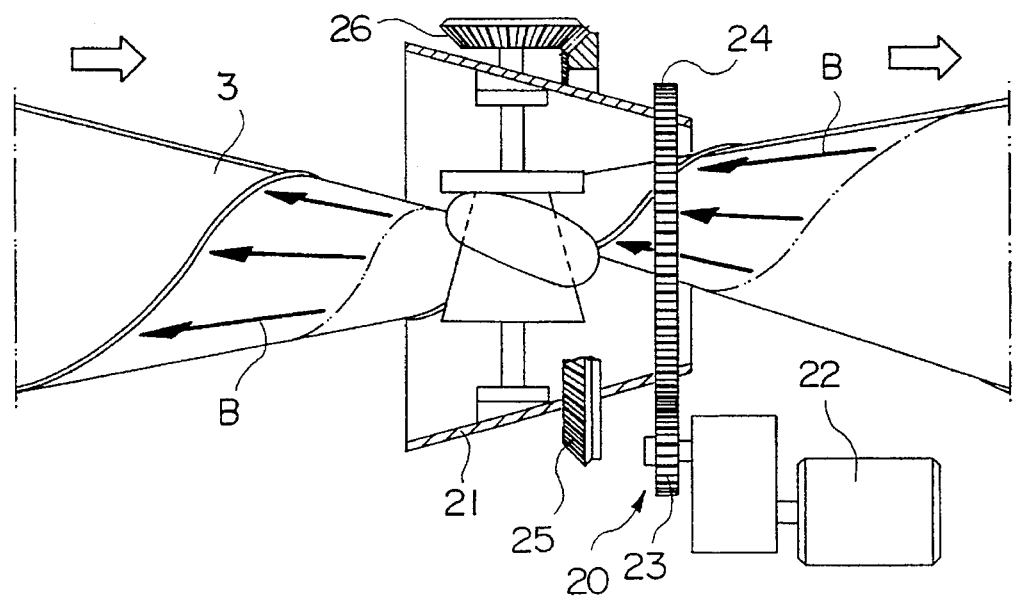
FIG. 5 is a sectional side elevation diagram illustrating the rotary motion of a wringing roller and concurrent twisting of a filter cloth member.

In the downstream portion of the filter cloth member 3 with respect to the wringing roller 4, the filter cloth member 3 is turned by the revolutionary motion of the wringing roller 4 in a direction such that the twisting of the filter cloth member 3 is undone, as indicated by arrows B in FIG. 5. Therefore, the twisted portion of the filter cloth member 3 is gradually untwisted on leaving the wringing roller 4, and is spread out flatly as it nears the rotational member 2b (pulleys 5b, 5b). Finally, this portion of the filter cloth member 3 reaches the pulleys 5b, 5b, becoming completely flat without any twist, and then returns to the pulleys 5a, 5a, via the pulleys 7b, 7b, and the pulleys 7a, 7a.

Meanwhile, the pulleys 5a, 5a, and the pulleys 5b, 5b, are caused to rotate by the traveling of the filter cloth member 3. Therefore, it is not necessary to provide an additional rotational driver for these pulleys. However, in order to make the traveling of the filter cloth member 3 smoother, an independent driver may be provided which can rotate these pulleys at a speed corresponding to the speed of traveling of the filter cloth member 3. In this case, in order to raise the solid-liquid separation ratio of the wringing roller 4, the speed of rotation of the pulleys may be intentionally differentiated from (for example, made higher than) the speed of traveling of the filter cloth member 3, whereby a greater load (pressure) from the wringing roller 4 is applied to the filter cloth member 3.

Next, a solid-liquid substance is supplied from the feeder onto the filter cloth member 3 moving according to the above. Then, the solid-liquid substance supplied on the filter cloth member 3 is wrapped by the filter cloth member 3 being twisted, as the solid-liquid substance nears the wringing roller 4. The solid-liquid substance becomes almost completely wrapped as the filter cloth member 3 is further twisted. When the wrapped solid-liquid substance reaches the wringing roller 4, the filter cloth member 3 is further twisted, whereby the solid-liquid substance is squeezed by the filter cloth member 3, and pressure from the wringing roller 4 is applied thereto. Accordingly, the liquid content in the solid-liquid substance penetrates through the filter cloth material 10 of the filter cloth member 3, drips therefrom, flows into the housing sleeve 21, and is collected in the liquid collector 15. In this process, since the upstream portion of the filter cloth member 3 is adjacent to the larger-diameter end of the wringing roller, while the downstream portion is adjacent to the smaller diameter end, the portion of the filter cloth member 3 which has reached the wringing roller 4 presses, against the stopper 12, another portion of the filter cloth member 3 which is leaving. Thus, a larger pressure can be applied to the solid-liquid substance in the filter cloth member 3 (upstream with respect to the wringing roller 4) after it has traveled some distance around the wringing roller 4 and some solid-liquid separation has already taken place. Accordingly, the solid-liquid separation can be conducted at a higher solid-separation ratio.

The solid-liquid substance thus-subjected to the solid-liquid separation (i.e., solid content) is unwrapped as the portion of the filter cloth member 3 leaves the wringing roller 4 and is untwisted. Then, since the twisted portion was twisted three times, the surface of the filter cloth member which received the solid-liquid substance faces downward when it leaves the wringing roller 4, whereby the solid-liquid substance subjected to the solid-liquid separation (i.e., solid content) is dropped due to gravity onto the conveyer 16 which is located underneath. Furthermore, the solid content adhering to the filter cloth member 3 is scraped off by the scraper 17 to be directed onto the conveyer 16.

According to the above arrangement of the apparatus 1 for solid-liquid separation, the solid-liquid substance supplied onto the filter cloth member 3 is wrapped by the filter cloth member 3 as it is twisted, and then the twisted portion is wrung by the revolutionary motion of the wringing roller as it travels around the wringing roller 4. Accordingly, pressure from being squeezed in the filter cloth member 3 as well as pressure between the wringing roller 4 and the filter cloth member 3 are applied to the solid-liquid substance, and thus the liquid content in the solid-liquid substance penetrates through the filter cloth member 3 so that the solid content and the liquid content are separated.

Furthermore, although the filter cloth member 3 is wound once around the wringing roller 4 according to the above embodiment, it should be taken as a matter of course that the filter cloth member 3 may be wound twice or more times. In addition, any number of twist of the filter cloth member 3 are acceptable as long as it is at least once. In particular, when the filter cloth member 3 is twisted an even number of times, since the surface to which a solid-liquid substance was supplied still faces upwards when it leaves the wringing roller 4, the conveyer 16 may be disposed behind the pulleys 5b, 5b, so as to be able to collect solid content falling after passing over the pulleys 5b, 5b.

Moreover, although the wringing roller 4 is in the shape of a truncated cone according to the above embodiment, it may be in a cylindrical shape. Even in this case, solid-liquid separation can be conducted sufficiently, since pressure from the twisting of the filter cloth member 3 can also be applied to the solid-liquid substance.

Moreover, whereas the filter cloth member 3 is constructed by attaching the pair of looped rope members 9, 9 to both lateral ends of the filter cloth material 10, respectively, according to the above embodiment, another looped rope member may be added to the central portion of the filter cloth material 10. In this case, the rope member added to the central portion furthermore improves the effect of wringing.

Moreover, although each of the rotational members 2a, 2b is constructed from a pair of pulleys, and the filter cloth member 3 is constructed from a filter cloth material 10 and the pair of rope members 9, 9 according to the above embodiment, each of the rotational members 2a, 2b may be in a cylindrical (columnar) shape, and besides, the filter cloth members 3 may be constructed simply from a filter cloth material 10. When this is the case, in order to spread out the filter cloth material 10 flatly at the rotational members, mechanisms to hold the lateral end portions of the filter cloth material 10 may be provided in the vicinity of the rotational members.

What is claimed is:

1. A method for solid-liquid separation comprising the steps of:

causing a looped filter cloth member to travel, said filter cloth member being wound at least once around a wringing roller, and having a twisted portion at which said filter cloth member is twisted at least once and wound around said wringing roller;

inducing a primary rotary motion of said wringing roller in a direction in which said filter cloth member travels;

inducing secondary rotary motion of said wringing roller in a direction in which said filter cloth member is twisted upstream with respect to said wringing roller; and supplying a solid-liquid substance to an upstream portion of said filter cloth member with respect to said wringing roller, with liquid in said solid-liquid substance penetrating the filter cloth member as said filter cloth member travels past said wringing roller.

2. A method for solid-liquid separation according to claim 1, wherein said wringing roller is in a shape of a truncated cone having a smaller-diameter end and a larger-diameter end, tapering toward one end of an axis of said wringing roller;

said wringing roller is provided with a stopper at said smaller-diameter end, said stopper having a diameter larger than the diameter of said smaller-diameter end; and said filter cloth member is wound around said wringing roller in a manner such that an upstream portion of said filter cloth member with respect to said wringing roller is adjacent to said larger-diameter end, and a downstream portion of said filter cloth member with respect to said wringing roller is adjacent to said smaller-diameter end.

3. A method for solid-liquid separation according to claim 1, wherein said filter cloth member is twisted an odd number of times at said twisted portion.

4. A method for solid-liquid separation according to claim 2, wherein said filter cloth member is twisted an odd number of times at said twisted portion.

* * * * *